United States Patent [19]
Akamatsu

[11] Patent Number: 5,860,666
[45] Date of Patent: Jan. 19, 1999

[54] STRUCTURE OF FRONT FORK FOR BICYCLE

[75] Inventor: Kanzo Akamatsu, Kashiwa, Japan

[73] Assignee: Sakae Co., Ltd., Tokyo, Japan

[21] Appl. No.: 797,912

[22] Filed: Feb. 10, 1997

[30] Foreign Application Priority Data

Apr. 3, 1996 [JP] Japan ................................... 8-106333

[51] Int. Cl.⁶ .................................................. B62K 17/30
[52] U.S. Cl. ...................... 280/276; 280/279; 188/322.12
[58] Field of Search .................................. 280/276, 279, 280/280; 188/322.12; 267/249, 250

[56] References Cited

U.S. PATENT DOCUMENTS

| 5,398,954 | 3/1995 | Chonan | 280/276 |
| 5,472,221 | 12/1995 | Kameda et al. | 280/276 |
| 5,626,355 | 5/1997 | Voss et al. | 280/279 |

FOREIGN PATENT DOCUMENTS

| 494450 | 7/1950 | Belgium | 280/276 |
| 1091192 | 4/1955 | France | 280/276 |
| 500810 | 2/1939 | United Kingdom | 280/276 |
| 528236 | 10/1940 | United Kingdom | 280/276 |
| 568263 | 3/1945 | United Kingdom | 280/276 |
| 570110 | 6/1945 | United Kingdom | 280/276 |

*Primary Examiner*—Brian L. Johnson
*Assistant Examiner*—Gary Sauitt
*Attorney, Agent, or Firm*—McDermott, Will & Emery

[57] ABSTRACT

A structure of a front fork 10 for a bicycle, which has a buffering mechanism relatively easy to mount and relatively simple in construction, comprising a pair of expandable fork blade portions 13 for the bicycle, including a pair of supporting pipes 21 extending downwardly from a crown portion 11, and a pair of sliding pipes 22 sidably fitted over the supporting pipes 21, wherein cylindrical spring structure 18 for elastically supporting each sliding pipe 22 is provided between the top end 22a of the sliding pipe 22 and the bottom end of the crown portion 11, and the cylindrical spring structure 18 is so arranged as to surround the supporting pipe 21, and wherein a stopper 30 for regulating a stroke of vertical movement of a connection member 17 is provided between the crown portion 11 and the connection member 17 connecting the pair of sliding pipes 22 in a body.

5 Claims, 4 Drawing Sheets

STRUCTURE OF FRONT FORK FOR BICYCLE

BACKGROUND OF THE INVENTION

1. Field of the Invention

The present invention relates to a structure of a bicycle front fork, and more particularly to a bicycle front fork in which a buffering mechanism is built.

2. Prior Art

It has been proposed to build a buffering mechanism in the front fork as means for improving the riding comfort on a bicycle.

In one of the conventional buffering mechanisms of this kind, a pair of expandable fork blade portions are provided, in which a pair of supporting pipes extending downwardly from a crown portion of the front fork are respectively fitted in a telescopic configuration with the corresponding sliding pipes, provided at their lower ends with bearing portions to support the front wheel. In the sliding pipes of the fork blades, an elastic member is disposed which receives a compressive force from the compression of the two pipes fitted together in a telescopic configuration. On account of this construction, specifically, by the buffering action of the elastic member, the riding comfort on a bicycle is improved.

However, in the conventional buffering mechanism, the elastic members are disposed in the sliding pipes having the bearings for the front wheel, and in some cases, for reasons of design, the sliding pipes incorporating the elastic members become smaller in diameter toward the lower ends or are often curved forward in an arch.

When the sliding pipes are formed in such a special design, in the thin and long sliding pipes, the capacity of the elastic members is sometimes restricted, so that it becomes difficult to secure a sufficient capacity for the elastic members to adequately buffer a strong impact force.

In addition, in each sliding pipe, two stopper mechanisms are incorporated: one to prevent the elastic members from being subjected to an excessive compressive deformation and the other to prevent the sliding pipe from coming off from the supporting pipe, namely, a measure against a rebound. For this reason, mounting the buffering mechanism in the front fork is not easy and the construction related to the buffering mechanism becomes complicated.

SUMMARY OF THE INVENTION

The object of the present invention is to provide a structure of a bicycle front fork with a buffering mechanism, which is free of severe restriction on the capacity of the elastic members, relatively easy to mount, and relatively simple in construction.

In order to solve the above-mentioned problems, the present invention adopts a construction described in the following.

According to the present invention, there is provided a bicycle front fork comprising a crown portion having attached thereto a steering tube extending upwardly; a pair of expandable fork blade portions, including a pair of supporting pipes extending downwardly from the crown portion, and sliding pipes slidably fitted over the corresponding supporting pipes and having at the lower ends thereof axle bearings to support the axle of the front wheel, wherein spring means, generally cylindrical in shape, for elastically supporting one sliding pipe is arranged between the top end of the sliding pipe and the bottom end of the crown portion in such a manner as to surround the supporting pipe, and wherein in a connection member for connecting the pair of the sliding pipes as one body or integrally, a stopper mechanism for regulating a stroke of vertical movement of the connection member is provided between the connection member and the crown portion.

In the structure of a bicycle front fork according to the present invention, the cylindrical spring means for elastically supporting the sliding pipe of each expandable fork blade is arranged below the crown portion in such a manner as to surround the supporting pipe. Therefore, without inserting conventional buffering elastic member into the sliding pipes, an impact can be buffered by the cylindrical spring means. Therefore, the dimensions and the capacity enough to buffer the impact can be secured for the cylindrical spring means because they are not restricted by the design of the sliding pipes.

The stopper mechanism provided in conjunction with the connection member moving in a body with the sliding pipes regulates the excessive movement of the sliding pipes which causes excessive compression and expansion of the cylindrical spring means. Therefore, without incorporating two stopper mechanisms in the sliding pipes as in the prior art, by using one stopper mechanism provided in conjunction with the connection member, it is possible to certainly prevent coming off of the sliding pipe from the supporting pipe and also prevent excessive compressive deformation of the cylindrical spring means. A rebound buffering member may be incorporated in this stopper mechanism.

If, for example, a buffering rubber member in cylindrical shape is used as the cylindrical spring means, this cylindrical buffering rubber member may be charged with a function as a dust cover to protect the sliding surfaces of the supporting pipe and the sliding pipe from water or dust.

For the cylindrical spring means, a spring assembly may be used, which includes a pair of cylindrical rubber members arranged in a straight line, an intermediate sleeve member placed between the opposing inner end faces of the pair of cylindrical rubber members, and a pair of outer sleeves located at the outer ends of those cylindrical rubber members.

In this spring assembly, a relatively large deformation stroke can be obtained by a combination of two cylindrical rubber members even if a relatively small dimension is set for the length of the cylindrical rubber members, and moreover, the cylindrical rubber members can be prevented from suffering buckling by compression in the axial direction thereof, thus making it possible to buffer an impact more adequately.

Alternatively, for the cylindrical spring means, another spring assembly may be used, which includes a compression coil spring, and an expandable dust cover enclosing the compression coil spring. To this expandable dust cover, a bellows construction may be applied. By forming an upper and an under cover, generally in a cylindrical shape, by a synthetic resin material, and fitting those covers together in a telescopic configuration, the radial expansion of the dust cover during the compressive deformation of the compression coil spring can be eliminated, for which reason the dust cover of the telescopic type is advantageous in respect of design.

DESCRIPTION OF THE PREFERRED EMBODIMENTS

The present invention will be described referring to embodiments shown in the accompanying drawings.

Figure 1:
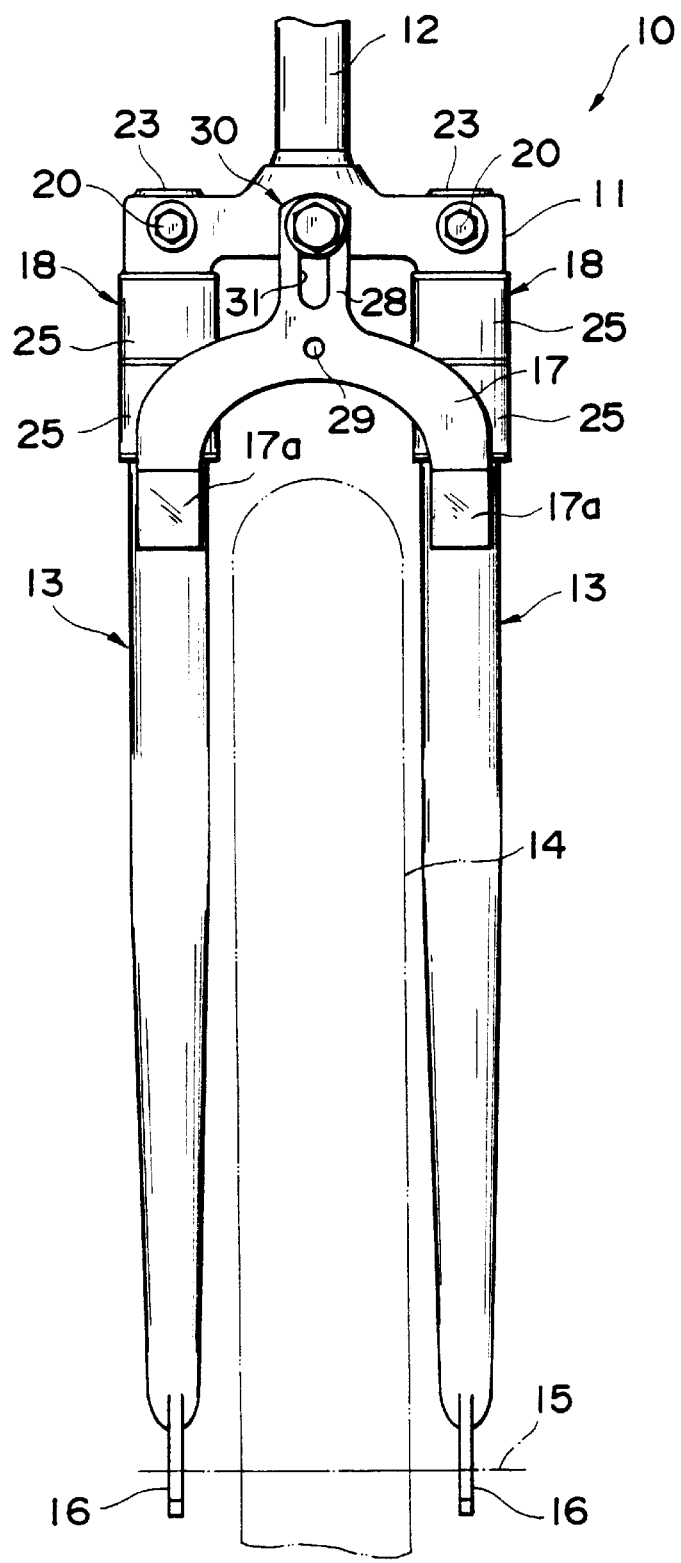
FIG. 1 is a front view showing the principal part of a front fork in a bicycle according to the present invention.

FIG. 1 is a front view showing a principal part of a bicycle front fork according to the present invention. The bicycle front fork 10 according to the present invention comprises a crown portion 11, a steering tube 12 extending upwardly from the top surface of the central part of the crown portion 11, and a pair of fork blade portions 13 provided spaced a certain distance to each other and extending downwardly from the bottom faces of both sides portions of the crown portion 11.

Bearings 16, which rotatably support the axle 15 of a front wheel 14 disposed between the two fork blade portions 13, are provided at the lower ends of the fork blades 13. As is well known, the steering tube 12 is held rotatably by a head tube (not shown) of a bicycle frame, not shown, and the steering tube 12 is rotated about its axis by steering the handle (not shown) mounted to the steering tube 12.

A connection member 17 is provided between the crown portion 11 and the fork blade portions 13, cylindrical spring means 18 is mounted on each fork blade portion 13.

Figure 2:
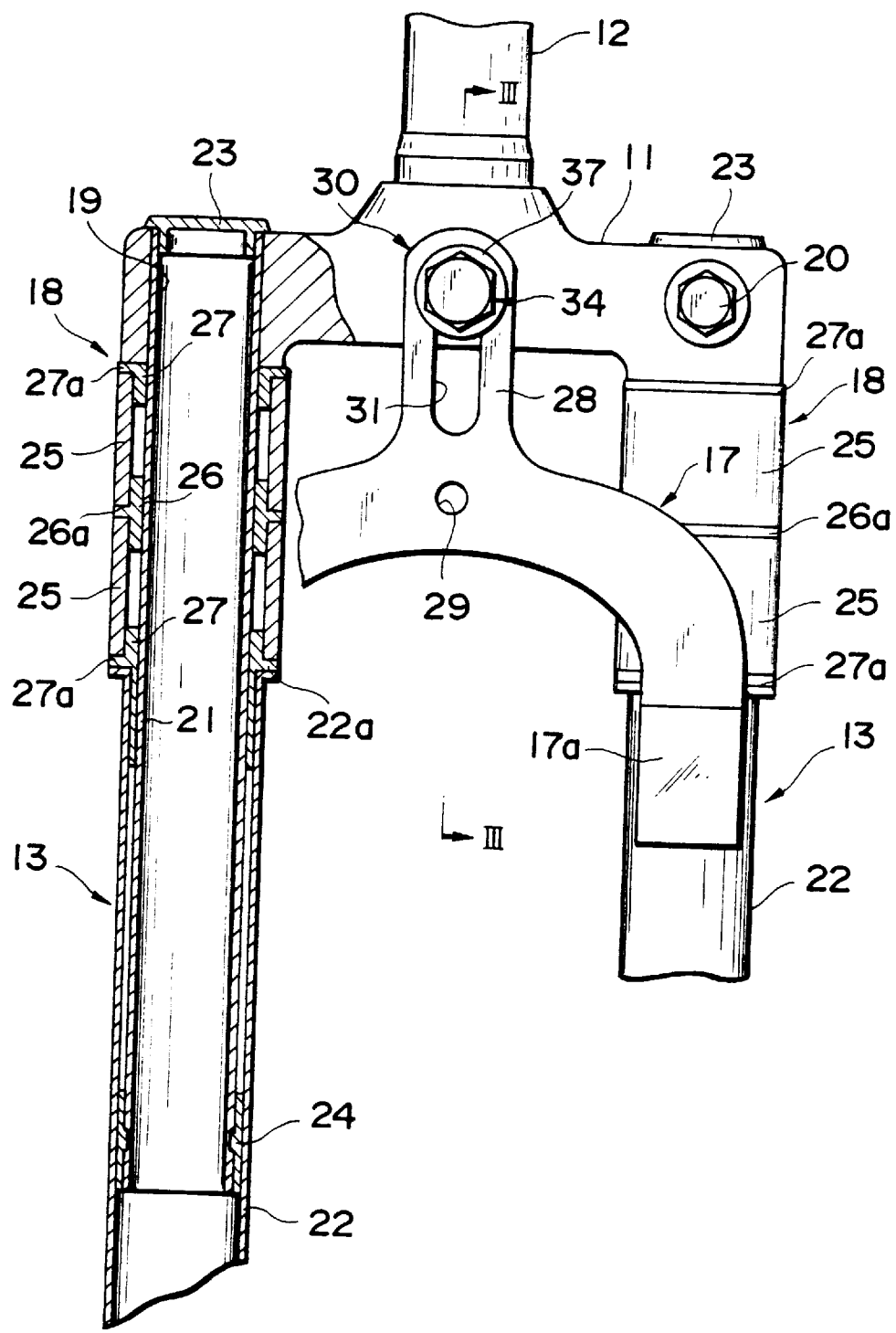
FIG. 2 is a fragmentary view on an enlarged scale, partially in cross section, of the bicycle front fork shown in FIG. 1.

FIG. 2 is a fragmentary view of the fork blade portion on an enlarged scale, partially in cross section.

As shown in FIG. 2, each fork blade portion 13 includes a straight supporting pipe 21 which has its top end portion inserted into a corresponding mounting hole 19 on either side of the crown portion 11 and fixed to the crown portion 11 with a locking bolt 20, and a sliding pipe 22 which contains the lower portion of the supporting pipe 21.

The pipes 21 and 22 are fitted together in a telescopic configuration so as to be slidable along the longitudinal axis, and on that account the fork blade portion 13 can expand and contract in the longitudinal direction thereof under the crown portion 11.

The supporting pipe 21 has a cap member 23 mounted at its top end to close the opening. The supporting pipe 21 has mounted on the outer circumferential surface at its lower end a cylindrical sleeve 24 of a synthetic resin material, for example, for smooth sliding motion of the sliding pipe 22 against the supporting pipe 21.

Each spring means 18 is so arranged as to encircling the supporting pipe 21 between the crown portion 11 and the top end of the sliding pipe 22. In the example shown in FIG. 2, the spring means 18 is a spring assembly, including a pair of cylindrical rubber members 25, an intermediate sleeve 26 to be inserted between the rubber members 25, and a pair of outer sleeves 27.

Each of the sleeves 26 and 27 is cylindrical in shape, made of a synthetic resin material, and fitted on the supporting pipe 22. The flange portions 26a and 27a are used to hold the end faces of the rubber members 25. Those sleeves 26 and 27 may be formed of the same synthetic resin material as in the cylindrical sleeve 24.

The spring means 18 is mounted around the supporting pipe 21 between the crown portion 11 and the sliding pipe 22 to arrange a pair of the rubber members 25 in a straight line. The sleeves 26 and 27 are fitted to the rubber members 25 seated on the flange portions 26a and 27a such that the intermediate sleeve 26 is inserted between the opposing inner end faces of the rubber members 25 and the outer sleeves 27 are positioned at the outer end faces of the rubber members 25.

The spring means 18 contacts the bottom face of the crown portion 11 through the intermediary of the upper outer sleeve 27 and also contacts the flange portion 22a at the top end of the sliding pipe 22 through the intermediary of the lower outer sleeve 27. The spring means 18 can be mounted to the fork blade portion 13 by successively fitting the rubber members 25 and the sleeves 26 and 27 on the supporting pipe 21 without gluing those components.

When the fork blade portion 13 contracts, the spring means 18 elastically supports the sliding pipe 22 as the two rubber members 25 are subjected to compressive deformation in their axial direction between the bottom end face of the crown portion 11 and the flange portion 22a at the sliding pipe 22.

The connection member 17 connects the sliding pipes 22 of both fork blade portions 13 integrally or in a body to thereby prevent a torsion of the axle 15 of the front wheel 14 during contraction and expansion of the fork blade portions 13. The connection member 17 is fixed at both ends 17a to the sliding pipes 22 by welding, for example.

A prolonged portion 28 extending upwardly to the crown portion 11 is provided at the center of the connection member 17. In the example shown in FIG. 2, a mounting hole 29 for mounting a caliper brake is formed.

Figure 3:
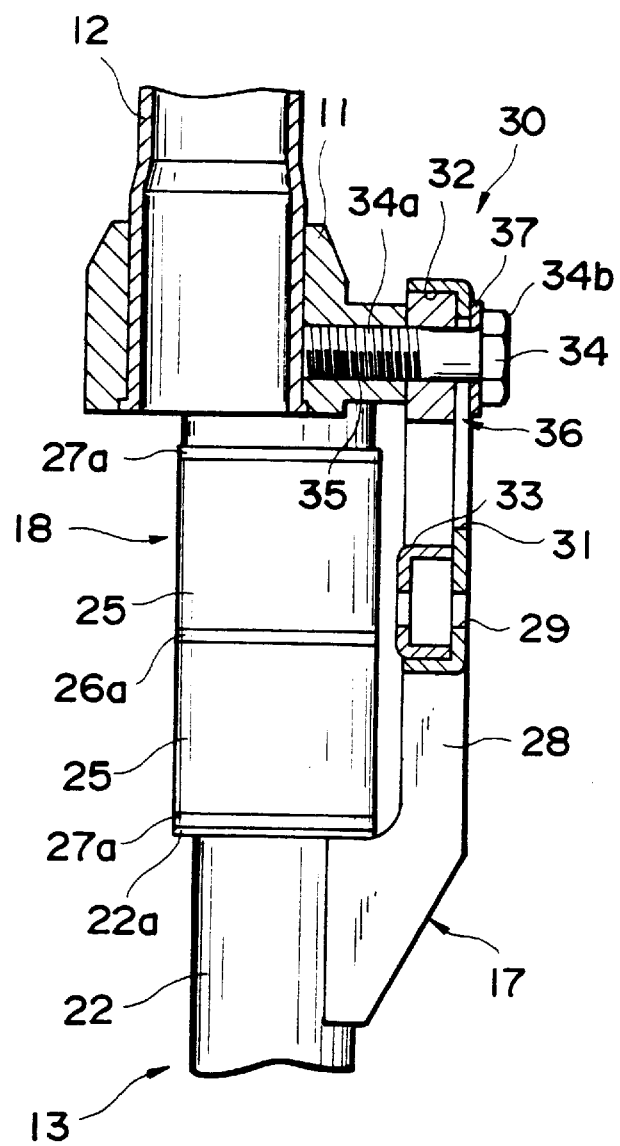
FIG. 3 is a sectional view taken a long the line III—III shown in FIG. 2.

A stopper mechanism 30 is provided in conjunction with the prolonged portion 28 of the connection member 17 and the crown portion 11. As clearly shown in FIG. 3 taken along the line III—III shown in FIG. 2, the stopper mechanism 30 includes an elongated hole 31 formed in the prolonged portion 28 and extending in the longitudinal direction of the prolonged portion 28, and upper and lower stoppers 32 and 33 formed in the prolonged portion 28 and located near both ends of the elongated hole 31.

A stopper pin 34 passing through and extending beyond the elongated hole 31 is provided at the crown portion 11. In the example shown in FIG. 3, the stopper pin 34 is a bolt driven into a tapped hole 35 of the crown portion 11, and the stem portion 34a of the stopper pin 34 is fitted with a cylindrical buffering rubber member 36 which can contact the upper stopper 32 and the lower stopper 33. The stem portion 34a of the stopper pin 34 has fitted thereon a resin spacer 37 for smooth slipperiness between the head portion 34b and the connection member 17.

The stopper mechanism 30 regulates the vertical movement of the connection member 17 by having its stopper pin 34 contact the upper stopper 32 and the lower stopper 33. More specifically, the stopper mechanism 30 prevents excessive compressive deformation of the rubber members 25 mounted in the spring means 18 by having the lower half of the rubber member 36 contact the lower stopper 33 of the connection member 17 which moves in a body with the fork blade portion 13 when the fork blade portion 13 contracts, and the stopper mechanism 30 also prevents a direct contact between the stopper pin 34 and the lower stopper 33, thus buffering the impact.

The stopper mechanism 30 prevents the sliding pipes 22 from coming off from the supporting pipes 21 by having the upper half of the rubber member 36 contact the upper stopper 32, and also prevents a direct contact between the stopper pin 34 and the upper stopper 32 during a rebound following the contraction of the fork blade portion 13, thus buffering the impact.

Therefore, the bicycle front fork 10 according to the present invention can appropriately absorb an impact that acts on the fork blade portions 13 by the buffering action of the spring means 18, and certainly prevent the sliding pipes 22 of the fork blade portions 13 from coming off, and also appropriately absorb an impact from a rebound.

Because of not being mounted inside the sliding pipe 22, the spring means 18 is not subject to restriction from the design of the sliding pipes 22, and therefore appropriate dimensions can be set for the thickness, length, etc. of the rubber members 25 so as to buffer an impact effectively.

The spring means 18 can be installed by merely fitting the parts 25, 26 and 27 on the supporting pipe 21, and therefore can be replaced more easily than before.

Moreover, by the use of a single stopper mechanism 30, it is possible to prevent the spring means 18 from being subject to excessive compressive deformation, and prevent the sliding pipes 22 from coming off, so that the construction of the stopper mechanism can be simplified.

Instead of the rubber members 25, elastic members such as a compression coil spring may be used. However, by using a cylindrical rubber members 25 as shown in FIG. 2, it is possible to charge the rubber members 25 with a function as a dust cover covering the sliding face of the supporting pipe 21. This obviates the need to use a special dust-preventive, waterproof dust cover covering the outside portion of the elastic members such as a compression coil spring, and on account of this, the rubber members 25 should preferably be adopted for a reduction of the number of parts to be used.

Also, instead of a pair of rubber members 25, a cylindrical rubber member twice as long in longitudinal direction as the rubber member 25 may be used. However, a rubber member with such a large length is liable to buckling when it is subjected in its longitudinal direction to compressive deformation. When the rubber member suffers buckling, it cannot be expected to perform a required buffering action, and as shown in FIG. 2, each spring means 18 should preferably be formed of two or more rubber members 25.

Figure 4:
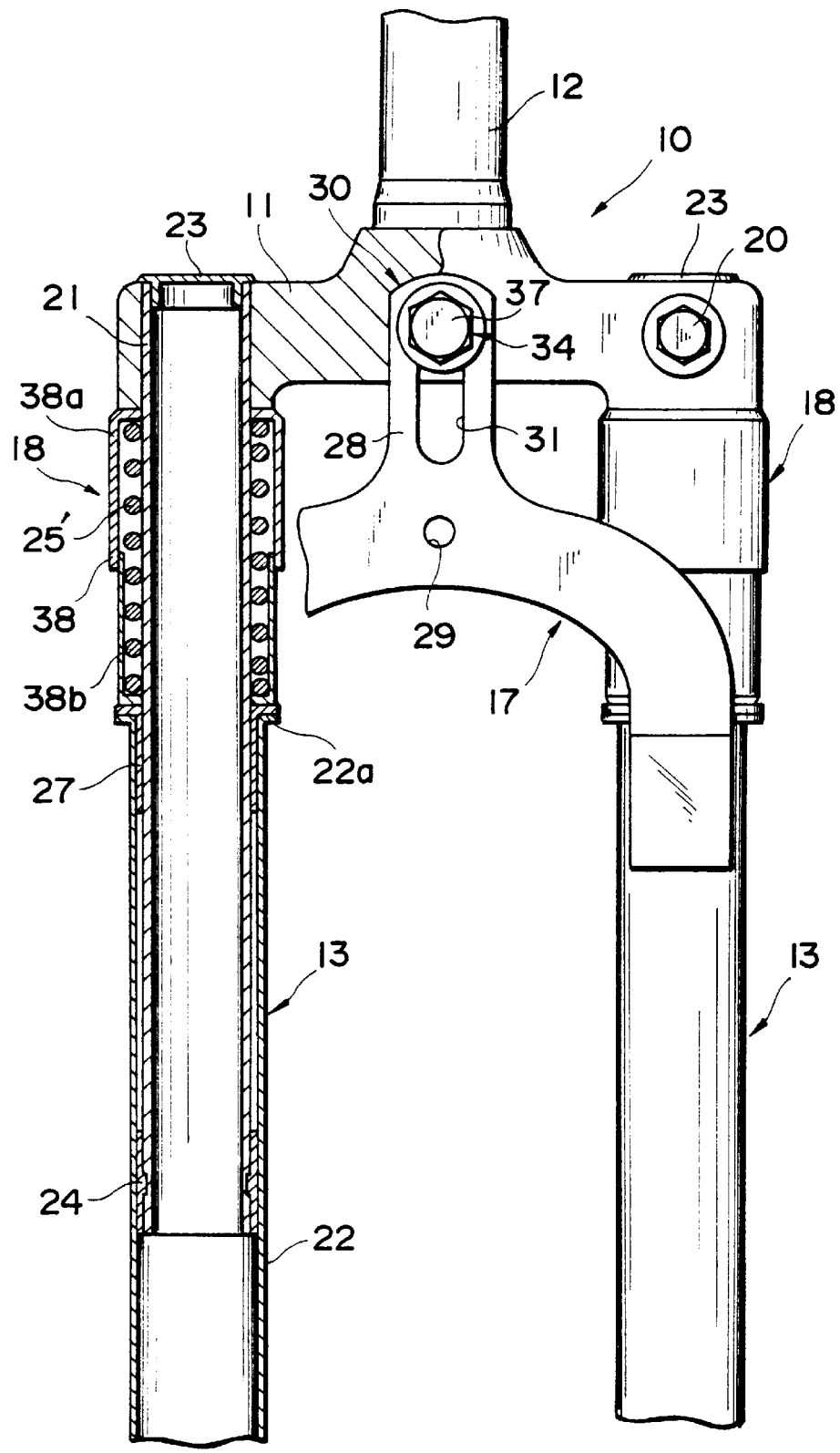
FIG. 4 is a drawing, similar to FIG. 2, showing another embodiment of the present invention.

FIG. 4 shows an example in which a spring assembly is used as the spring means 18, which includes a cylindrical coil spring 25'.

An expandable dust cover 38 in a telescopic configuration is mounted on the compression coil spring 25'. In the example of FIG. 4, the dust cover 38 includes an upper cover 38a and an under cover 38b, which are made of a hard synthetic resin material, such as polypropylene or polyethylene, and which are fitted together with one end portion of the upper cover 38a placed over one end portion of the under cover 38b. The other end of the upper cover 38a is held between the top end of the compression coil spring 25' and the bottom end of the crown portion 11. On the other hand, the other end of the under cover 38b is held between the sleeve 27 sitting on the flange portion 22a of the sliding pipe 22 and the bottom end of the compression coil spring 25'.

The dust cover 38 contracts and expands by having the dust covers slide with respect to each other according to the contraction and expansion of the compression coil spring 25'. Therefore, the dust cover 38 encloses the compression coil spring 25' without hindering the buffering action by the compression coil spring 25'. Thus, the compression coil spring 25' and the sliding faces of the supporting pipe 21 and the sliding pipe 22 are protected from water and dust.

The dust cover 38 may be formed by a cylindrical member of a bellows construction. However, the telescopic dust cover 38 including the upper cover 38a and the under cover 38b as shown in FIG. 4 is advantageous in respect of design since this construction can prevent the dust cover 38 from expanding radially during the compressive deformation of the compression coil spring 25'. By the combination of this telescopic dust cover 38 with the compression coil spring 25', it is possible to provide a bicycle front fork 10 incorporating the spring means 18 superior in design at relatively low cost.

In the construction of a front fork for a bicycle according to the present invention, as mentioned earlier, because an impact can be alleviated by the cylindrical spring means mounted on the upper portions of the sliding pipes, without being subject to restriction from the design of the sliding pipes, the dimensions and the capacity sufficient to buffer an impact can be secured for the cylindrical spring means. Furthermore, by a single stopper mechanism provided in conjunction with the connection member separate from the cylindrical spring means, it is possible to prevent coming off of the sliding pipes and excessive compressive deformation of the cylindrical spring means.

Therefore, according to the front fork for a bicycle according to the present invention, an impact can be alleviated appropriately without mounting the buffering mechanism including the spring means and the stopper mechanism in the sliding pipes, and coming off of the sliding pipes from the supporting pipes and excessive compression of the spring means can be prevented certainly only by one stopper mechanism. Thus, this bicycle front fork can buffer an impact appropriately to improve the riding comfort on a bicycle by the buffering mechanism relatively easy to mount and relatively simple in construction.

What is claimed is:

1. A structure of a front fork for a bicycle, comprising:
   a crown portion having attached thereto a steering tube extending upwardly;
   a pair of expandable fork blade portions, including a pair of supporting pipes extending downwardly from the crown portion, and a pair of sliding pipes slidably fitted over corresponding supporting pipes, said fork blade portions being provided at the lower ends with axle bearings to hold an axle of the front wheel;
   spring means, generally cylindrical in shape, for elastically supporting each sliding pipe, the spring means surrounding each supporting pipe between a top end of each sliding pipe and a bottom end of the crown portion;
   a connection member for connecting the sliding pipes to make the sliding pipes move together; and
   a stopper mechanism, mounted between the connection member and the crown portion, for regulating a stroke of vertical movement of the connection member;
   wherein the stopper mechanism includes a vertically extending elongated hole formed in the connection member, a stopper pin extending from the crown portion and passing through the elongated hole, and a cylindrical stopper rubber member which surrounds the stopper pin.

2. A structure of a front fork for a bicycle according to claim 1, wherein the spring means includes a cylindrical buffering rubber member covering a portion of the sliding face of the supporting pipe which protrudes beyond the sliding pipe.

3. A structure of a front fork for a bicycle according to claim 1, wherein the spring means is a spring assembly including a pair of cylindrical rubber members arranged in a straight line, a cylindrical intermediate sleeve member inserted between opposing inner ends of the cylindrical rubber members, and a pair of outer sleeves arranged at outer ends of the cylindrical rubber members.

4. A structure of a front fork for a bicycle according to claim 1, wherein the spring means is a spring assembly including a compression coil spring which surrounds the supporting pipe, and a dust cover which surrounds the compression coil spring and which is capable of contraction and expansion with the compression coil spring.

5. A structure of a front fork for a bicycle according to claim 4, wherein the dust cover includes an upper cover and an under cover both made of a synthetic resin material and fitted together in a telescopic configuration with one end portion of the upper cover placed over one end portion of the under cover.

* * * * *